(12) United States Patent
Chou (10) Patent No.: US 10,187,105 B2
(45) Date of Patent: Jan. 22, 2019

(54) PORTABLE PRODUCT LANYARD (71) Applicant: Shenzhen Shengmalinuo Science and Technology Co., LTD., Shenzhen (CN)

(72) Inventor: Aswan Chou, Shenzhen (CN)

(73) Assignee: SHENZHEN SHENGMALINUO SCIENCE AND TECHNOLOGY CO., LTD., Shenzhen (CN)

( * ) Notice: Subject to any disclaimer, the term of this patent is extended or adjusted under 35 U.S.C. 154(b) by 94 days.

(21) Appl. No.: 15/627,382

(22) Filed: Jun. 19, 2017

(65) Prior Publication Data

US 2018/0367181 A1    Dec. 20, 2018

(51) Int. Cl.
| | |
|---|---|
| *H04B 1/00* | (2006.01) |
| *H04B 1/3888* | (2015.01) |
| *A45F 5/00* | (2006.01) |
| *A45C 11/00* | (2006.01) |
| *H04B 1/38* | (2015.01) |

(52) U.S. Cl.
CPC ............ *H04B 1/3888* (2013.01); *A45F 5/00* (2013.01); *A45C 11/00* (2013.01); *A45C 2011/002* (2013.01); *A45F 2005/006* (2013.01); *H04B 1/38* (2013.01)

(58) Field of Classification Search
CPC . H04B 1/3888; H04B 1/38; A45F 5/00; A45F 2005/006; A45C 11/00; A45C 2011/002
USPC .......................................................... 224/600
See application file for complete search history.

(56) References Cited

U.S. PATENT DOCUMENTS

| | | | | |
|---|---|---|---|---|
| 6,707,924 | B1* | 3/2004 | Okiebisu ................... | A45F 5/00 181/128 |
| 7,195,413 | B2* | 3/2007 | Kremizis ................ | A45F 5/004 224/162 |
| 7,774,969 | B1* | 8/2010 | Silverman ............ | H05K 5/0278 224/257 |
| D660,822 | S * | 5/2012 | Holst .......................... | D14/205 |
| D684,542 | S * | 6/2013 | Ledesma ...................... | D13/153 |
| 2002/0090099 | A1* | 7/2002 | Hwang ................... | H04M 1/05 381/312 |
| 2007/0053523 | A1* | 3/2007 | Iuliis .......................... | A45F 5/00 381/77 |
| 2008/0283651 | A1* | 11/2008 | Ito ........................... | A45F 5/004 242/386 |
| 2012/0261443 | A1* | 10/2012 | Brown ..................... | A45F 5/00 224/250 |

(Continued)

*Primary Examiner* — Peter N Helvey (57) ABSTRACT

A portable product lanyard includes a base. The base includes a first main body and a second main body movably connected with the first main body. The second main body includes a fixing portion, a supporting portion, a driving portion, a moving portion and a resetting portion. The supporting portion tightly fixes to the fixing portion, the driving portion is supported by the supporting portion, the moving portion is movably received in the fixing portion. The driving portion drives the moving portion move relative to the fixing portion so as to the second main body assembled or unassembled to the first main body. The resetting portion mounts with the fixing portion so as to drive the driving portion and the moving portion reset. The configuration of the portable product lanyard may greatly improve user's enjoying convenience to tie or untie the portable product from the lanyard.

20 Claims, 7 Drawing Sheets

(56) References Cited

U.S. PATENT DOCUMENTS

2016/0183668 A1\* 6/2016 Grossman ................ A45F 5/00
                                                        224/576

\* cited by examiner

PORTABLE PRODUCT LANYARD

BACKGROUND

1. Technical Field

The present disclosure generally relates to lanyards field, and especially relates to a portable product lanyard.

2. Description of Related Art

With the development of technologies, portable products such as mobile phones, MP3s, digital cameras and personal digital assistants (PDAs) are now in widespread use, and consumers may now enjoy the full convenience of high technology products almost anytime and anywhere. Nowadays, users may enjoy adorning a lanyard for mounting accessories on the portable product, to add personalization and improve overall appearance of the portable product. The lanyard is generally hung on a rope, and the housing of the portable product has a hole defined for accommodating the rope. When assembling the lanyard onto the portable product, the rope is inserted through the hole, and then a knot is tied to secure the lanyard to the portable product.

However, it is very difficult to insert the rope through the hole because the hole usually is small. Additionally, when the lanyard is tied to the portable product, it is difficult to remove the portable product from the lanyard, thereby causing inconvenience to users.

SUMMARY

The disclosure relates to a portable product lanyard which may greatly improve user's enjoying convenience to tie or untie the portable product therefrom.

In one aspect, a portable product lanyard includes a base. The base includes a first main body and a second main body movably connected with the first main body. The second main body includes a fixing portion, a supporting portion, a driving portion, a moving portion and a resetting portion. The supporting portion tightly fixes to the fixing portion, the driving portion is supported by the supporting portion, and the moving portion is movably received in the fixing portion. The driving portion drives the moving portion move relative to the fixing portion so as to the second main body assembled or unassembled to the first main body. The resetting portion mounts with the fixing portion so as to drive the driving portion and the moving portion reset.

Wherein the portable product lanyard further includes a hanging buckle movably connected with the second main body, the hanging buckle is detached from or mounted to the second main body via the driving portion driving the moving portion move.

Wherein the driving portion drives the moving portion move along a first direction, the resetting portion drives the moving portion move alone a second direction opposite to the first direction, the resetting portion moves from a free state to a compressed state and the moving portion moves from an original state to a retraction state during the moving portion moving along the first direction; the resetting portion moves from the compressed state to the free state and the moving portion moves from the retraction state to the original state during the moving portion moves along the second direction.

Wherein the first main body includes a first receiving groove, the fixing portion includes a holder and a stopper, the holder passes through the first receiving groove and the stopper prevents the second main body from detaching from the first receiving groove.

Wherein the holder includes a receiving room defining a plurality of receiving recesses arranged at intervals, the moving portion includes a plurality of moving elements movably received in the corresponding receiving recesses.

Wherein the moving member includes a hollow moving body and an ear, the moving body includes a front wall, a back wall opposite to the front wall and a pair of sidewalls connected the front wall with the back wall, the ear protrudes outward from the top of the back wall.

Wherein the driving portion includes a driving body and a plurality of driving arms extending outward from the bottom periphery of the driving body, each driving arm abuts against a corresponding sidewall so as to drive the moving member move.

Wherein the sidewall includes a first sloping surface, each driving arm includes a second sloping surface abutting against the first sloping surface, the driving portion drives the moving member move via the first sloping surface and the second sloping surface.

Wherein the first sloping surface inclines from the front wall towards the back wall, the second sloping surface is formed on an inner surface of the driving arm.

Wherein the moving body further includes a fixing post horizontally protruding outward from the back wall to the front wall.

Wherein the resetting portion includes a plurality of springs, an end of the spring is coiled around a corresponding fixing post.

Wherein the front wall includes a through-hole, the spring passes through the through-hole and then is coiled around the fixing post.

Wherein the receiving room includes a protrusion protruding upward from the bottom of the receiving room, the protrusion includes a plurality of compartments each corresponding to the receiving recess, another end of the spring abuts against an inner wall of the compartment.

Wherein the receiving room includes a plurality of receiving columns perpendicularly protruding upward from the bottom of the receiving room, the receiving column includes a receiving hole, the supporting portion includes a plurality of supporting posts received in the corresponding receiving holes so as to tightly connect the supporting portion with the fixing portion.

Wherein the supporting portion includes a plurality of locating grooves, the driving arm includes a block received in a corresponding locating groove to position the driving portion on the supporting portion.

In another aspect, a portable product lanyard includes a base. The base includes a first main body, a second main body movably engaged with the first main body. The second main body includes a fixing portion, a supporting portion, a driving portion, a moving portion and a resetting portion. The driving portion drives the moving portion move relative to the fixing portion so as to the second main body assembled or unassembled to the first main body. The resetting portion is mounted to the fixing portion so as to drive the driving portion and the moving portion to reset and avoid the second main body detaching from the first main body. A hanging buckle movably connects with the second main body and detaches from or mounts to the second main body via the driving portion driving the moving portion move. A lanyard is mounted to the first main body.

Wherein the supporting portion tightly fixes to the fixing portion, the driving portion is supported by the supporting portion, the moving portion is movably received in the fixing portion, the resetting portion is mounted to the inner of the fixing portion; the driving portion drives the moving portion move along a first direction, the resetting portion drives the moving portion move along a second direction opposite to the first direction; the second main body moves from a first state to a second state when the moving portion moves along the first direction; the second main body moves from the second state to the first state when the moving portion moves along the second direction; the moving portion prevents the second main body from detaching from the first main body in the first state, and the second main body may detach from the first main body in the second state.

Wherein the first main body includes a first receiving groove and the fixing portion includes a holder and a stopper, the holder passes through the first receiving groove and the stopper prevents the second main body from detaching from the first receiving groove; the holder includes a receiving room defining a plurality of receiving recesses arranged at intervals, the moving portion includes a plurality of moving elements movably received in the corresponding receiving recesses.

Wherein each moving element includes a hollow moving body and an ear, the moving body includes a front wall, a back wall opposite to the front wall and a pair of sidewalls connected the front wall with the back wall, the ear protrudes outward from the top of the back wall; the driving portion includes a driving body and a plurality of driving arms extending outward from the bottom periphery of the driving body, each driving arm abuts against a corresponding sidewall so as to drive the moving element move.

Wherein when the second main body is in the first state, the resetting portion is in a free state and the moving portion is in an original state, the ear protrudes from the receiving room so as to prevent the second main body from detaching from the first receiving groove; when the second main body is in the second state, the resetting portion is in a compressed state and the moving portion is in a retraction state, the ear is received in the receiving room so as to detach the second main body from the first receiving groove.

The present disclosure provides the advantages as below.

The moving portion moves relative to the fixing portion so as to movably connect the first main body with the second main body via pressing the driving portion, which may greatly improve user's enjoying convenience to tie or untie the portable product from the portable product lanyard.

DETAILED DESCRIPTION

The disclosure is illustrated by way of example and not by way of limitation in the figures of the accompanying drawings, in which like reference numerals indicate similar elements.

Figure 1:
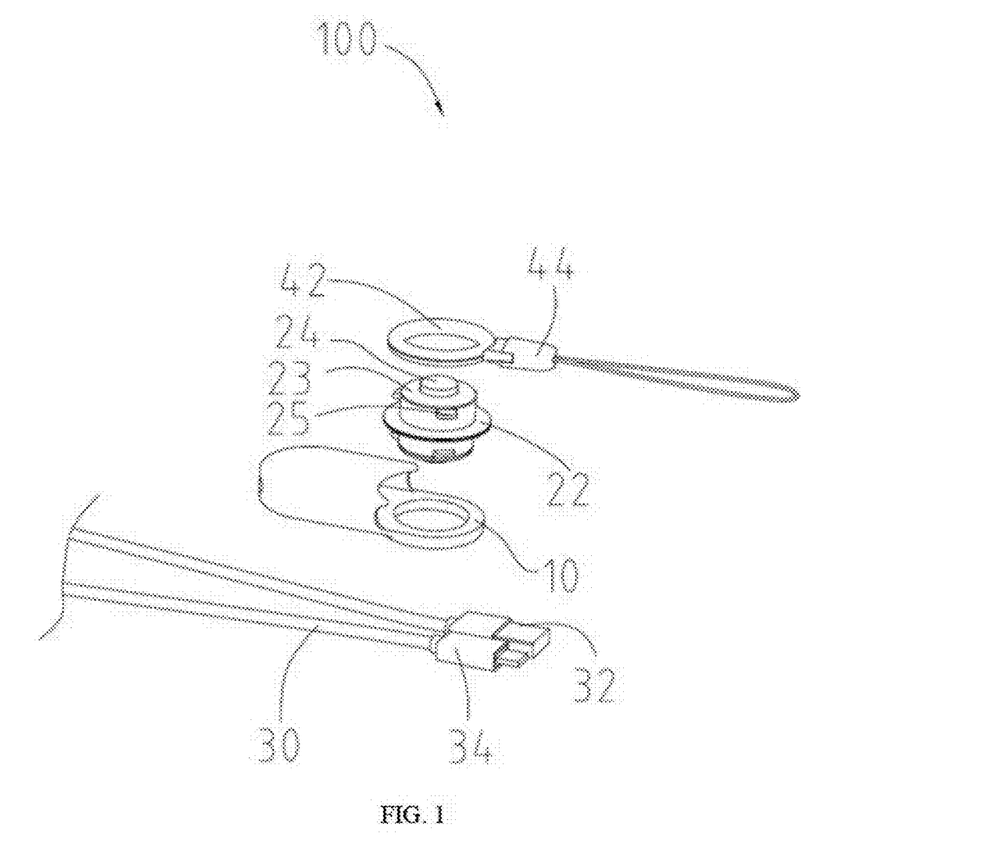
FIG. 1 is an exploded view of a portable product lanyard in accordance with an exemplary embodiment.
Figure 2:
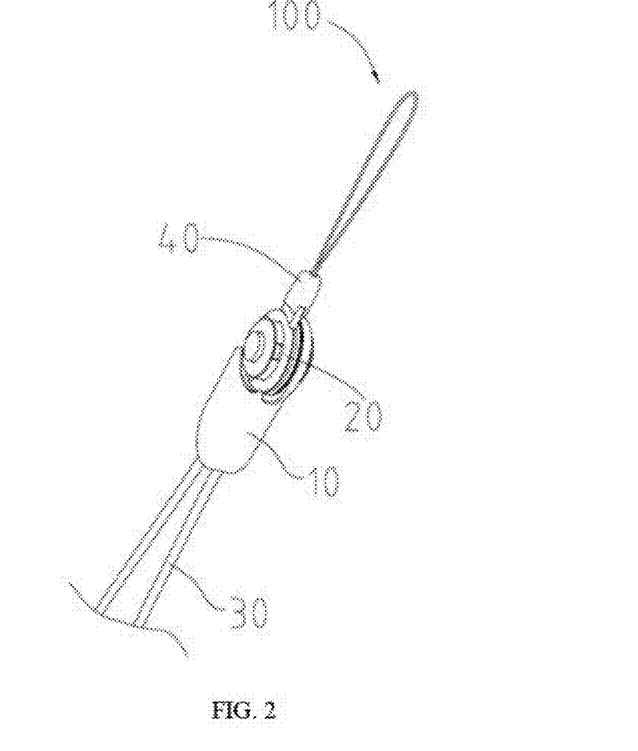
FIG. 2 is an assembled schematic view of the portable product lanyard of FIG. 1.

Referring to FIGS. 1-2, the portable product lanyard 100 according to an exemplary embodiment used for hanging a portable product (not shown) is shown. The portable product described here may be a mobile phone, an MP3, a digital camera or a personal digital assistant (PDA), etc. In this embodiment, the portable product is a mobile phone. The portable product lanyard 100 includes a base (not labeled). The base includes a first main body 10, a second main body 20 movably connected with the first main body 10, a rope 30 connected with the first main body 10, and a hanging buckle 40 movably connected with the second main body 20.

In this embodiment, the base and the rope 30 are two different elements. A user may hang the portable product around his neck by the rope 30. In other embodiments, the base may be integrated with the rope 30.

The second main body 20 includes a fixing portion 22, a supporting portion 23, a driving portion 24, a moving portion 25 and a resetting portion 26. The supporting portion 23 tightly fixes to the fixing portion 22 and supports the driving portion 24. The moving portion 25 is movably received in the fixing portion 22. The driving portion 24 drives the moving portion 25 move relative to the fixing portion 22 so as to the second main body 20 may be assembled or unassembled to the first main body 10. The resetting portion 26 connects with the fixing portion 22 so as to drive the driving portion 24 and the moving portion 25 reset.

In the embodiment of the disclosure, the portable product is connected with the second main body 20. The moving portion 25 moves relative to the fixing portion 22 by pressing the driving portion 24 so as to detach the second main body 20 from the first main body 10 or detach the portable product from the second main body 20 during needing to use the portable product. Otherwise, the moving portion 25 moves relative to the fixing portion 22 by pressing the driving portion 24 so as to assembly the second main body 20 to the first main body 10 or assembly the portable product to the second main body 20 during no needing to use the portable product. That is to say, the configuration of the portable product lanyard 100 may greatly improve user's enjoying convenience to tie or untie the portable product from the pendant.

The rope 30 includes a first connector 32 and a second connector 34. Both the first connector 32 and the second connector 34 are positioned on two ends of the rope 30. The function of the first connector 32 is different from that of the second connector 34. For example, the first connector 32 is a standard USB connector, the second connector 34 may select from a Micro USB connector, an apple USB connector and an android USB connector. With the configuration of the first connector 32 and the second connector 34, the portable product lanyard 100 may not only hang the portable product, but also may transmit data from other electronic devices, which greatly improves user's convenience to take along the portable product.

At the same time, the portable product lanyard 100 may be hung around user's neck. The portable product is protected from accidentally damage when the user walks in an obstacle to suddenly stop. Furthermore, the user may not feel distressed because the portable product is safely placed somewhere, the user goes out to take along the portable product around his neck by the lanyard 100 without needing a girpesack or a backpack.

The hanging buckle 40 is separated from or mounted to the second main body 20 via the driving portion 24 driving the moving portion 25 move. The hanging buckle 40 includes a hanging ring 42 and a connecting portion 44. The hanging ring 42 connects with the second main body 20 so as to hang the portable product on the portable product lanyard 100. The connecting portion 44 connects the portable product with the hanging ring 42. The hanging buckle 40 is removed from the second main body 20 during needing to use the portable product, otherwise the hanging buckle 40 is hung on the second main body 20 to prevent the portable product from losing or accidently damage during no needing to use the portable product. In this embodiment, the hanging ring 42 is circular configuration and metal material, thereby the portable product may be hung on user's fingers via the hanging ring 42 to avoid accidently damage during detaching the portable product from the lanyard 100.

Figure 3:
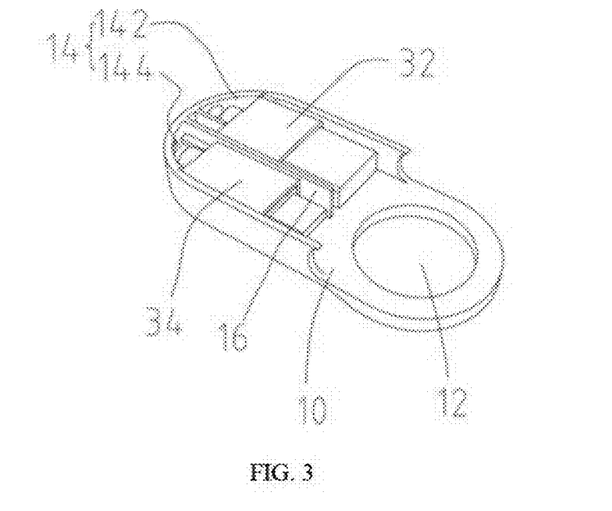
FIG. 3 is a partial schematic view of a first main body and a rope of the portable product lanyard of FIG. 1.

Referring to FIG. 3, the first main body 10 includes a first receiving groove 12 formed on an end thereof, a second receiving groove formed on an opposite end thereof, and a partition 16 formed on the middle thereof. The second receiving groove 14 is divided into a first recess 142 and a second recess 144 by the partition 16. The first recess 142 receives the first connector 32 therein and the second recess 144 receives the second connector 34 therein. In this embodiment, the area of the first recess 142 is larger than that of the second recess 144. Of course, in other embodiments the area of the first recess 142 may be less than or equal to that of the second recess 144.

Referring to FIGS. 4-10, the fixing portion 22 includes a holder 222 and a stopper 274. The holder 222 passes through the first receiving groove 12 and the stopper 224 prevents the second main body 20 from detaching from the first receiving groove 12. The holder 222 includes a receiving room 220. The receiving room 220 includes a plurality of receiving recesses 221 arranged at intervals, a plurality of receiving columns 226 perpendicularly extending upward from the bottom of the receiving room 220, and a protrusion 229 protruding upward from the bottom of the receiving room 220. Each receiving recess 221 includes a backboard 2210 and a pair of clapboards 2212 connected with the backboard 2210. The receiving column 226 is formed between every two adjacent recesses 221. The protrusion 229 includes a plurality of compartments 2291 each corresponding to the receiving recess 221, an opposite end of the resetting portion 26 abuts against the inner wall of the compartment 2291. The receiving column 226 includes a receiving hole 2260.

Figure 5:
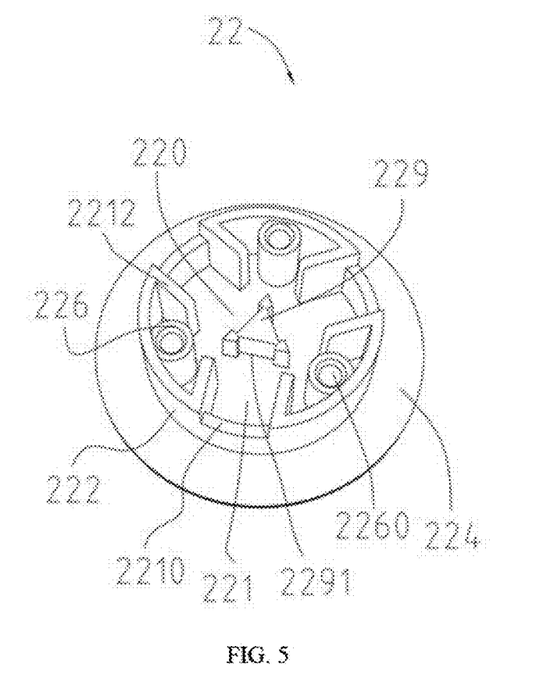
FIG. 5 is a schematic view of a fixing portion of the portable product lanyard of FIG. 1.

In the embodiment of the disclosure, all the receiving room 220, the supporting portion 23, the driving portion 24, the moving portion 25 and the resetting portion 26 are two. The backboard 221 is designed as the inner wall of the receiving room 220. In other embodiment, all the receiving room 220, the supporting portion 23, the driving portion 24, the moving portion 25 and the resetting portion 26 are one.

Figure 6:
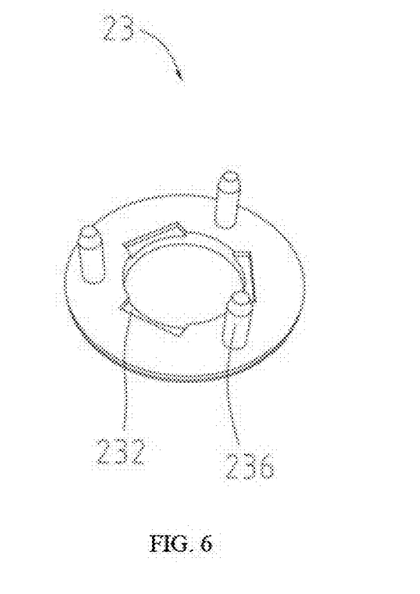
FIG. 6 is a schematic view of a supporting portion of the portable product lanyard of FIG. 1, but shown the supporting portion inverted.

The supporting portion 23 is circular configuration and includes a plurality of locating grooves 232 formed around a middle recess (not labeled), and a plurality of supporting posts 236 perpendicularly extending upward from the top thereof. Each supporting post 236 is formed between every two adjacent locating grooves 232. The supporting post 236 is received in a corresponding receiving hole 2260 so as to tightly connect the supporting portion 23 with the fixing portion 22.

Figure 7:
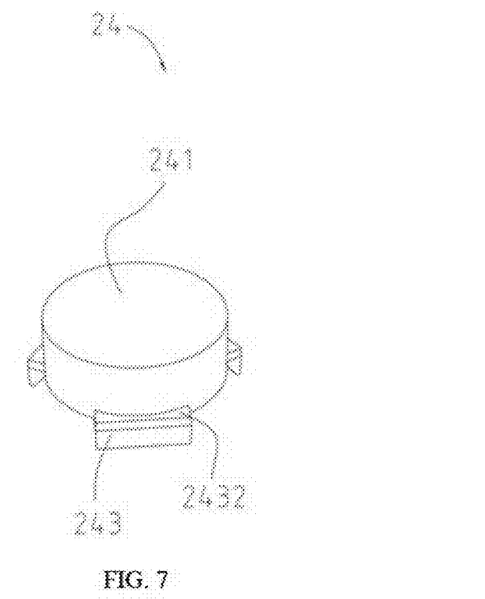
FIG. 7 is a schematic view of a driving portion of the portable product lanyard of FIG. 1.
Figure 8:
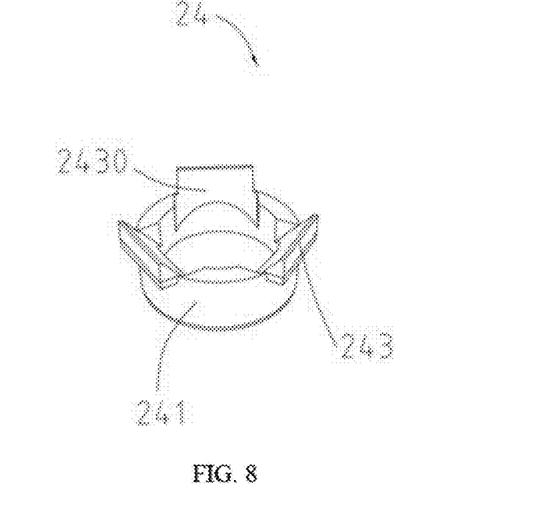
FIG. 8 is similar to FIG. 7, but showing the driving portion inverted.

The driving portion 24 is circular configuration and includes a driving body 241 and a plurality of driving arms 243 extending outward from the bottom periphery of the driving body 241. Each driving arm 243 abuts against a corresponding sidewall of the moving portion 25 so as to drive the moving portion 25 move. Each driving arm 243 includes a second sloping surface 2430 beveled from the top towards the bottom thereof, and a block 2432 formed on the outer thereof and received in a corresponding locating groove 232 to position the driving portion 24 on the supporting portion 23.

Figure 9:
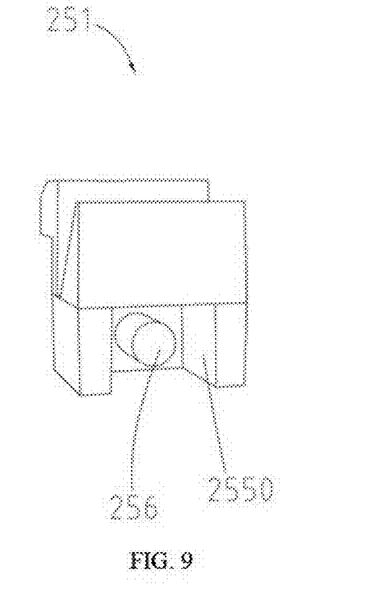
FIG. 9 is a schematic view of a moving element of the portable product lanyard of FIG. 1.
Figure 10:
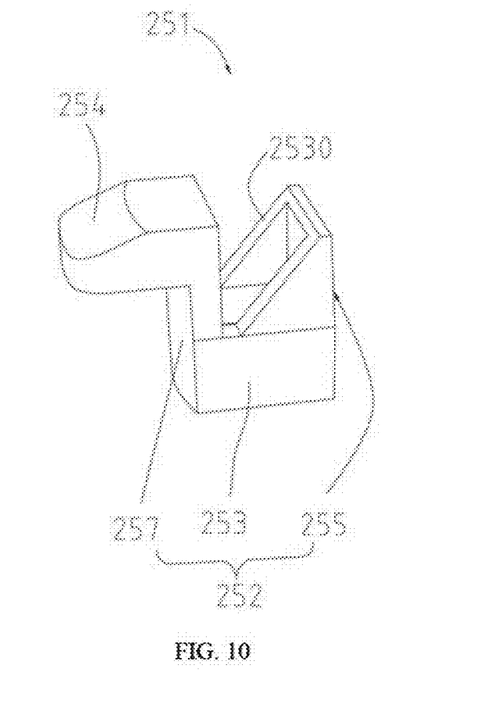
FIG. 10 is similar to FIG. 9, but shown the moving element from another view.

The moving portion 25 includes a plurality of moving elements 251 movably received in the corresponding receiving recesses 221. The moving element 251 includes a hollow moving body 252 and an ear 254 horizontally extending outward from a side of the moving body 252. The moving body 252 includes a pair of sidewalls 253, a front wall 255 connected with an end of the pair of sidewalls 253, and a back wall 257 opposite to the front wall 255 and connected with the opposite end of the pair of sidewalls 253. The ear 254 protrudes outward from the top of the back wall 257. Each sidewall 253 includes a first sloping surface 2530 abutting against the second sloping surface 2430. The first sloping surface 2530 inclines from the front wall 255 towards the back wall 257. The driving arm 243 abuts against a corresponding sidewall 253 so as to the driving portion 24 drive the moving element 251 move via the first sloping surface 2530 and the second sloping surface 2430. The moving body 252 further includes a fixing post 256 horizontally protruding outward from the back wall 257 towards the front wall 255. The front wall 255 includes a through-hole 2550 formed on the bottom thereof.

In the embodiment of the disclosure, the ear 254 is integrated with the back wall 257, both of the cross-sectional of the ear 254 and the hack wall 257 are L-shape configuration. A hypotenuse is formed at an area of the first sloping surface 2530 intersected with each sidewall 253. The second sloping surface 2430 abuts against the pair of sidewalls 253. The moving element 251 may move toward the compartment 2291 from a front opening (not labeled) of the receiving recess 221. At the same time, the clapboard 2212 may limit a movement direction of the moving element 251 so as to avoid diverging the right movement direction of the moving element 251.

Figure 4:
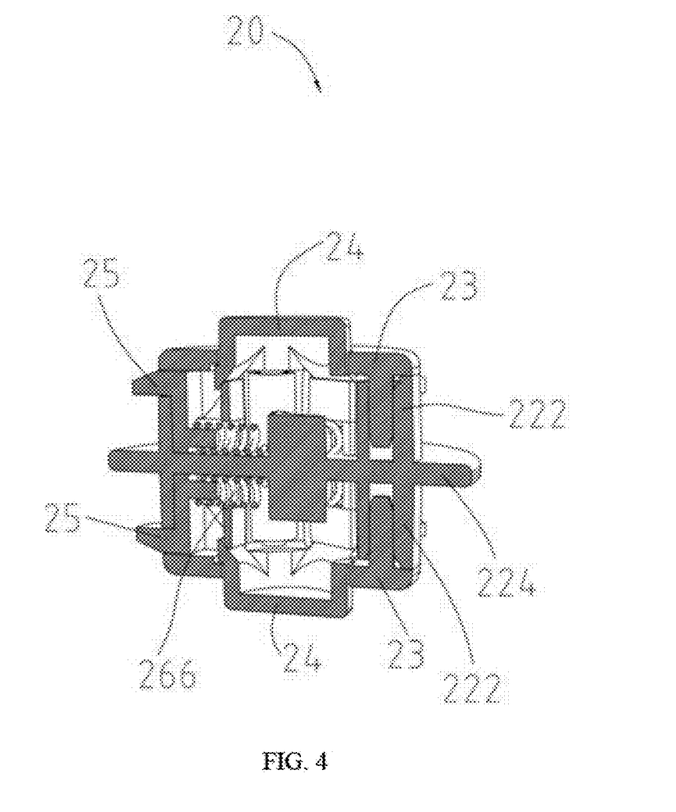
FIG. 4 is a cross sectional view of a second main body of the portable product lanyard of FIG. 1.

The resetting portion 26 includes a plurality of springs 266. An end of the spring 266 passes through the through-hole 2550 and then is coiled around the fixing post 256, the opposite end of the spring 266 abuts against the inner wall of the compartment 2291. In the embodiment, the spring 266 is linear spring configuration.

Figure 11:
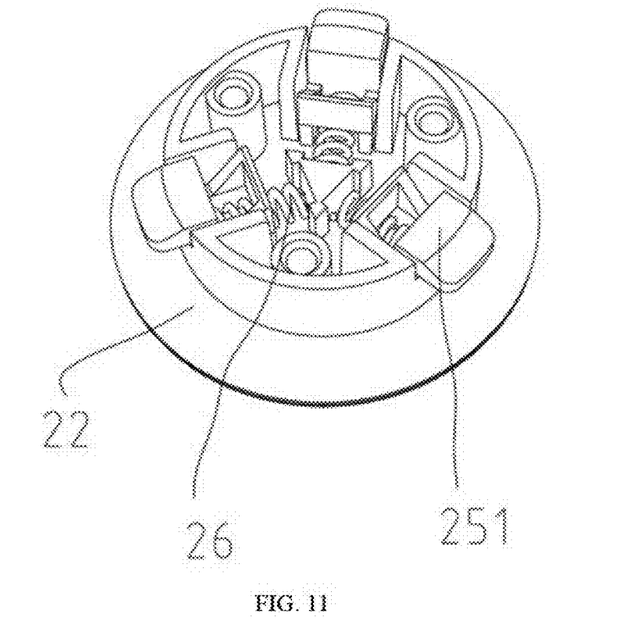
FIG. 11 is a partial assembly view of the second main body of the portable product lanyard of FIG. 1, shown the second main body in a first state.
Figure 12:
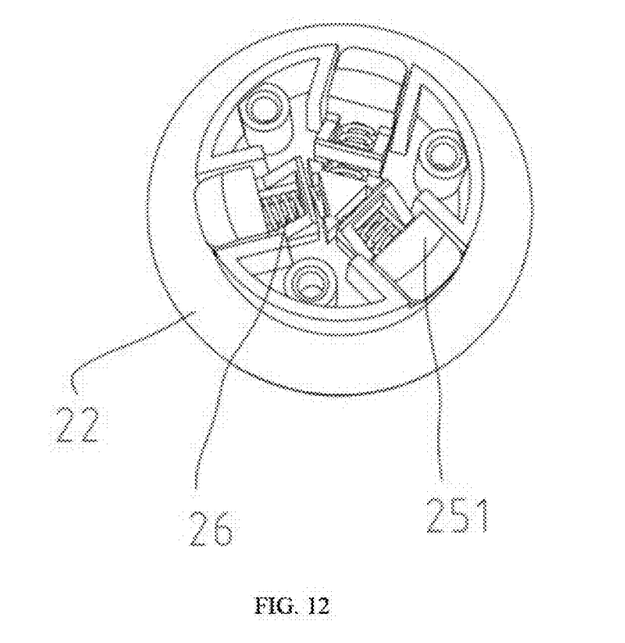
FIG. 12 is similar to FIG. 11, but shown the second main body in a second state.

Referring to FIGS. 1 & 11-12, the driving portion 24 drives the moving portion 25 move along a first direction, the resetting portion 26 drives the moving portion 25 move along a second direction opposite to the first direction. When the moving portion 25 moves along the first direction, the second retain body 20 moves from a first state to a second state, the resetting portion 26 moves from a free state to a compressed state, and the moving portion 25 moves from an original state to a retraction state. When the moving portion 25 moves along the second direction, the second main body 20 moves from the second state to the first state, the resetting portion 26 moves from the compressed state to the free state, and the moving portion 25 moves from the retraction state to the original state.

The moving portion 25 may automatically reset under the action of the resetting portion 26. When the holder 222 passes through the first receiving groove 12, the moving portion 25 moves to its original state under the action of the resetting portion 26, which may prevent the second main body 20 from detaching from the first main body 10 in the first state. Meanwhile, the second main body 20 may detach from the first main body 10 in the second state.

When the moving element 251 moves along the first direction, a force produced by the second sloping surface 2430 is applied to the two hypotenuses, thereby driving the moving element 251 move from the original state to the retraction state. When the moving element 251 moves along the second direction, the elastic force of the resetting portion 26 is applied to the moving element 251, thereby the moving element 251 moving from the retraction state to the original state. At the same time, the two hypotenuses of the moving body 252 apply force on the second sloping surface 2430 to drive the driving portion 24 reset.

Referring to FIGS. 1-12, when assembling the portable product lanyard 100, first, the first connector 32 and the second connector 34 is respectively received in the first recess 142 and the second recess 114 to mount the lanyard 30 to the first main body 10. Second, an end of the spring 266 is mounted to the fixing post 256 of the moving body 252, another end of the spring 266 abuts against a corresponding inner wall of the compartment 2291, thus the moving body 252 is received in a corresponding receiving recess 221. That is, the block 2432 is received in the locating groove 232, the supporting post 236 is received in a corresponding receiving hole 2260. In this way, the second sloping surface 2430 abuts against the first sloping surface 2530, thus the fixing portion 22, the supporting portion 23, the driving portion 24, the moving portion 25 and the resetting portion 26 are assembled together to form the second main body 20. Furthermore, when the driving portion 24 is pressed, the moving portion 25 moves from the original state to the retraction state, thereby one end of the holder 222 is received in the first recess 12, the hanging ring 42 of the hanging buckle 40 is hung on the opposite end of the holder 222. When the driving portion 24 is loosened, the moving portion 25, under the action of the resetting portion 26, moves from the retraction state to the original state, thus the second main body 20 movably mounts to the first main body 10. Thus, the first main body 10, the second main body 20, the lanyard 30 and the hanging buckle 40 are assembled together to form the portable product lanyard 100.

When needing to use first connector 32 and/or the second connector 34 of the lanyard 30, the moving portion 25 moves from the original state to the retraction state by pressing the driving portion 24. That is, the second main body 20 moves from the first state to the second state to detach from the first main body 10, thereby the first connector 32 and/or the second connector 34 are taken out from the second recess 14. Furthermore, the moving portion 25 returns back the original state from the retraction state by loosening the driving portion 24, the hanging buckle 40 connected with the portable product mounts to the second body 20, thereby the portable product is hung on the lanyard 100 to prevent the portable product from accidental loss and damage. When needing to take out the portable product from the lanyard 100, as long as pressing the driving portion 24, the moving portion 25 moves from the original state to the retraction state, the hanging buckle 40 is removed from the second main body 20, thereby the portable product is taken out from the lanyard 100.

In the embodiment of the disclosure, when second main body 20 is in the first state, that is to say, the moving portion 25 is in the original state and the resetting portion 26 is in the free state, the ear 254 of the moving portion 25 protrudes outward from the receiving room 220, thereby the second main body 20 may not separate from the first recess 12. Additionally, when the second main body 20 is in the second state, that is to say, the moving portion 25 is in the retraction state and the resetting portion 26 is in the compressed state, the ear 254 of the moving portion 25 is received in the receiving room 220, thereby the second main body 20 may detach from the first recess 12.

All the receiving room 220, the supporting portion 23, the driving portion 24, the moving portion 25 and the resetting portion 26 are two, thus, the second main body 20 is a symmetrical configuration. Any end of the holder 222 may be received in the first recess 12, and the hanging buckle 40 may be optionally mounted to any end of the holder 222. That is, the reasonable configuration of the lanyard 100 may greatly improve user's enjoying convenience.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A portable product lanyard comprising a base; the base comprising:
    a first main body;
    a second main body movably connected with the first main body, the second main body comprising a fixing portion, a supporting portion, a driving portion, a moving portion and a resetting portion, the supporting portion tightly fixing to the fixing portion, the driving portion supported by the supporting portion, the moving portion movably received in the fixing portion, the resetting portion mounting to the fixing portion so as to drive the driving portion and the moving portion reset, wherein the driving portion drives the moving portion move relative to the fixing portion so as to the second main body assembled or unassembled to the first main body.

2. The portable product lanyard as claimed in claim 1, wherein the portable product lanyard further comprises a hanging buckle movably connected with the second main body, the hanging buckle is detached from or mounted to the second main body via the driving portion driving the moving portion move.

3. The portable product lanyard as claimed in claim 1, wherein the driving portion drives the moving portion move along a first direction, the resetting portion drives the moving portion move along a second direction opposite to the first direction, the resetting portion moves from a free state to a compressed state and the moving portion moves from an original state to a retraction state during the moving portion moving along the first direction; the resetting portion moves from the compressed state to the free state and the moving portion moves from the retraction state to the original state during the moving portion moves along the second direction.

4. The portable product lanyard as claimed in claim 3, wherein the first main body comprises a first receiving groove, the fixing portion comprises a holder and a stopper, the holder passes through the first receiving groove and the stopper prevents the second main body from detaching from the first receiving groove.

5. The portable product lanyard as claimed in claim 4, wherein the holder comprises a receiving room defining a plurality of receiving recesses arranged at intervals, the moving portion comprises a plurality of moving elements movably received in the corresponding receiving recesses.

6. The portable product lanyard as claimed in claim 5, wherein the moving member comprises a hollow moving body and an ear, the moving body comprises a front wall, a back wall opposite to the front wall and a pair of sidewalls connected the front wall with the back wall, the ear protrudes outward from the top of the back wall.

7. The portable product lanyard as claimed in claim 6, wherein the driving portion comprises a driving body and a plurality of driving arms extending outward from the bottom periphery of the driving body, each driving arm abuts against a corresponding sidewall so as to drive the moving element move.

8. The portable product lanyard as claimed in claim 7, wherein the sidewall comprises a first sloping surface, each driving arm comprises a second sloping surface abutting against the first sloping surface, the driving portion drives the moving member move via the first sloping surface and the second sloping surface.

9. The portable product lanyard as claimed in claim 8, wherein the first sloping surface inclines from the front wall towards the back wall, the second sloping surface is formed on an inner surface of the driving arm.

10. The portable product lanyard as claimed in claim 6, wherein the moving body further comprises a fixing post horizontally protruding outward from the back wall to the front wall.

11. The portable product lanyard as claimed in claim 10, wherein the resetting portion comprises a plurality of springs, an end of the spring is coiled around a corresponding fixing post.

12. The portable product lanyard as claimed in claim 11, wherein the front wall comprises a through-hole, the spring passes through the through-hole and then is coiled around the fixing post.

13. The portable product lanyard as claimed in claim 11, wherein the receiving room comprises a protrusion protruding upward from the bottom of the receiving room, the protrusion comprises a plurality of compartments each corresponding to the receiving recess, another end of the spring abuts against an inner wall of the compartment.

14. The portable product lanyard as claimed in claim 5, wherein the receiving room comprises a plurality of receiving columns perpendicularly protruding upward from the bottom of the receiving room, the receiving column comprises a receiving hole, the supporting portion comprises a plurality of supporting posts received in the corresponding receiving holes so as to tightly connect the supporting portion with the fixing portion.

15. The portable product lanyard as claimed in claim 14, wherein the supporting portion comprises a plurality of locating grooves, the driving arm comprises a block received in a corresponding locating groove to position the driving portion on the supporting portion.

16. A portable product lanyard comprising a base, the base comprising:

a first main body;
a second main body movably engaged with the first main body, the second main body comprises a fixing portion, a supporting portion, a driving portion, a moving portion and a resetting portion, wherein the driving portion drives the moving portion move relative to the fixing portion so as to the second main body assembled or unassembled to the first main body; wherein the resetting portion is mounted to the fixing portion so as to drive the driving portion and the moving portion reset and avoid the second main body detaching from the first main body;
a hanging buckle movably connected with the second main body and detached from or mounted to the second main body via the driving portion driving the moving portion move;
a lanyard mounted to the first main body.

17. The portable product lanyard as claimed in claim 16, wherein the supporting portion tightly fixes to the fixing portion, the driving portion is supported by the supporting portion, the moving portion is movably received in the fixing portion, the resetting portion is mounted to the inner of the fixing portion; the driving portion drives the moving portion move along a first direction, the resetting portion drives the moving portion move along a second direction opposite to the first direction; the second main body moves from a first state to a second state when the moving portion moves along the first direction; the second main body moves from the second state to the first state when the moving portion moves along the second direction; the moving portion prevents the second main body from detaching from the first main body in the first state, and the second main body may detach from the first main body in the second state.

18. The portable product lanyard as claimed in claim 17, wherein the first main body comprises a first receiving groove and the fixing portion comprises a holder and a stopper, the holder passes through the first receiving groove and the stopper prevents the second main body from detaching from the first receiving groove; the holder comprises a receiving room defining a plurality of receiving recesses arranged at intervals, the moving portion comprises a plurality of moving elements movably received in the corresponding receiving recesses.

19. The portable product lanyard as claimed in claim 18, wherein each moving member comprises a hollow moving body and an ear, the moving body comprises a front wall, a back wall opposite to the front wall and a pair of sidewalls connected the front wall with the back wall, the ear protrudes outward from the top of the back wall; the driving portion comprises a driving body and a plurality of driving arms extending outward from the bottom periphery of the driving body, each driving arm abuts against a corresponding sidewall so as to drive the moving member to move.

20. The portable product lanyard as claimed in claim 19, wherein when the second main body is in the first state, the resetting portion is in a free state and the moving portion is in an original state, the ear protrudes from the receiving room so as to prevent the second main body from detaching from the first receiving groove; when the second main body is in the second state, the resetting portion is in a compressed state and the moving portion is in a retraction state, the ear is received in the receiving room so as to detach the second main body from the first receiving groove.

* * * * *